(12) United States Patent
Chen et al.

(10) Patent No.: US 8,351,417 B2
(45) Date of Patent: Jan. 8, 2013

(54) METHODS FOR EFFICIENT ORGANIZATION OF VEHICLE PEER GROUPS AND EFFICIENT V2R COMMUNICATIONS

(75) Inventors: Wai Chen, Parsippany, NJ (US); Taek Jin Kwon, Morganville, NJ (US); John Lee, Howell, NJ (US); Ryokichi Onishi, Jersey City, NJ (US); Toshiro Hikita, Tama (JP)

(73) Assignees: Telcordia Technologies, Inc., Piscataway, NJ (US); Toyota InfoTechnology Center, U.S.A., Inc., Palo Alto, CA (US)

( * ) Notice: Subject to any disclaimer, the term of this patent is extended or adjusted under 35 U.S.C. 154(b) by 1213 days.

(21) Appl. No.: 12/120,330

(22) Filed: May 14, 2008

(65) Prior Publication Data

US 2009/0285197 A1 Nov. 19, 2009

(51) Int. Cl.
*H04L 12/28* (2006.01)

(52) U.S. Cl. ........ 370/351; 370/217; 370/389; 370/474; 455/16

(58) Field of Classification Search .................. 709/203, 709/242, 238; 370/390, 392, 328, 389, 217; 370/474, 254, 315, 455; 455/16, 466, 436, 455/422.1; 725/32; 713/158

See application file for complete search history.

(56) References Cited

U.S. PATENT DOCUMENTS

| | | | | |
|---|---|---|---|---|
| 4,949,248 | A * | 8/1990 | Caro ............................. | 709/203 |
| 6,498,936 | B1 * | 12/2002 | Raith ............................ | 455/466 |
| 6,754,188 | B1 * | 6/2004 | Garahi et al. .................. | 370/328 |
| 7,466,664 | B2 * | 12/2008 | Ghosh et al. .................. | 370/254 |
| 7,720,060 | B2 * | 5/2010 | Greene et al. ................. | 370/389 |
| 7,746,887 | B2 * | 6/2010 | McFarland ..................... | 370/455 |
| 7,751,390 | B2 * | 7/2010 | Mosko et al. ................. | 370/389 |
| 7,966,419 | B2 * | 6/2011 | Mosko et al. ................. | 709/238 |
| 2002/0126671 | A1 * | 9/2002 | Ellis et al. ..................... | 370/390 |
| 2002/0137459 | A1 * | 9/2002 | Ebata et al. .................... | 455/16 |
| 2004/0013115 | A1 * | 1/2004 | Su et al. ........................ | 370/392 |
| 2004/0018841 | A1 * | 1/2004 | Trossen ......................... | 455/436 |
| 2004/0078485 | A1 * | 4/2004 | Narayanan .................... | 709/242 |
| 2004/0143842 | A1 * | 7/2004 | Joshi .............................. | 725/32 |
| 2004/0167988 | A1 * | 8/2004 | Rune et al. .................... | 709/238 |
| 2005/0078672 | A1 * | 4/2005 | Caliskan et al. .............. | 370/389 |
| 2005/0147028 | A1 * | 7/2005 | Na et al. ........................ | 370/217 |
| 2006/0056456 | A1 * | 3/2006 | Ratiu et al. .................... | 370/474 |
| 2008/0085702 | A1 * | 4/2008 | Park et al. ................... | 455/422.1 |
| 2008/0095163 | A1 * | 4/2008 | Chen et al. .................... | 370/392 |
| 2009/0235071 | A1 * | 9/2009 | Bellur et al. .................. | 713/158 |
| 2009/0323579 | A1 * | 12/2009 | Bai et al. ....................... | 370/315 |

OTHER PUBLICATIONS

International Search Report dated Jul. 1, 2009.

\* cited by examiner

*Primary Examiner* — Melanie Jagannathan
*Assistant Examiner* — Parth Patel
(74) *Attorney, Agent, or Firm* — Philip J. Feig

(57) ABSTRACT

The present invention provides methods for efficient control message distribution in a VANET. Efficient flooding mechanisms are provided to fulfill the objective of flooding (delivering a message to every connected node) with a limited number of re-broadcasting by selected key nodes. A suppression-based efficient flooding mechanism utilizes a Light Suppression (LS) technique to reduce the number of flooding relays by giving up the broadcasting of a flooding message when a node observes downstream relay of the same flooding message. Additionally, a relay-node based efficient flooding mechanism selects Relay Nodes (RN) to form an efficient flooding tree for control message delivery. RNs are nodes that relay at least one control message, for instance a Membership Report (MR) to the upstream node in "k" previous control message cycles The upstream node may be the group header (GH) for the LPG.

15 Claims, 11 Drawing Sheets

METHODS FOR EFFICIENT ORGANIZATION OF VEHICLE PEER GROUPS AND EFFICIENT V2R COMMUNICATIONS

CROSS-REFERENCE TO RELATED APPLICATIONS

The present invention is related to commonly owned, co-pending U.S. patent application Ser. No. 11/585,047 filed Oct. 23, 2006 entitled Method and Communication Device for Routing Unicast and Multicast Messages in an Ad-hoc Wireless Network (the "'047 application").

FIELD OF THE INVENTION

The present invention relates to a communication network in a mobile environment. More specifically, the invention relates to methods for efficient distribution of control messages in a multi-hop Vehicular Ad-hoc Network (VANET).

BACKGROUND

Wireless communication has become common in all aspects of life today, whether it be a wireless home or office network, so-called "hotspot" networks at local cafes, fast food chains or hotels, or even citywide implementations of WiFi technologies. This desire to become a society of wireless communication has even extended to moving devices such as a moving vehicle. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from a stationary infrastructure. Vehicles communicate with each other when they are within the same radio range of each other or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 milli-seconds) and sustained throughput (or equivalently, the percentage of neighboring vehicles that successfully receive warning messages) in order to support various VSC applications such as collision avoidance. The '047 application describes a method for organizing groups of moving vehicles into a Local Peer Group (LPG) by selecting one moving vehicle as a group header, maintaining the LPG using the group header, and generating local routing information. The LPG is formed by transmission of control messages such as heartbeats (HB) and membership reports (MR). The HB message has been implemented using flooding mechanisms. The moving vehicles are adapted for unicast and multicast routing.

However, flooding is a major control overhead of LPG-based routing protocols including the unicast and multicast protocols. In each HB cycle, a HB is re-broadcasted at least as many times as the number of members in LPG. In situations where the number of neighbor nodes is large, such as in a traffic jam, duplicate HBs significantly add to this overhead. Flooding requires every node to re-broadcast the flooding message. In these situations, flooding may exhaust network bandwidth, further owing to the large size of control messages in large LPGs. Since control message distribution is a core component of LPG-based protocols, there is a need for efficient control message distribution.

SUMMARY OF THE INVENTION

The present invention provides systems and methods for efficient control message distribution in a VANET. An efficient flooding mechanism is provided to fulfill the objective of flooding (delivering a message to every connected node) with a limited number of re-broadcasting by selected key nodes.

A suppression-based efficient flooding mechanism utilizes a Light Suppression (LS) technique to reduce the number of flooding relays by giving up the broadcasting of a flooding message when a node observes downstream relay of the same flooding message.

Additionally, a relay-node based efficient flooding mechanism selects Relay Nodes (RN) to form an efficient flooding tree for control message delivery. RNs are nodes that relay at least one control message, for instance a Membership Report (MR) of a downstream node to the upstream node in "k" previous control message cycles. The upstream node may be the group header (GH) for the LPG.

In one embodiment, the present invention is a method for efficient dissemination of control messages between nodes within a local peer group in a wireless ad-hoc network. The method comprises receiving a first control message including at least one routing parameter from a group header node, determining whether or not the first control message has been broadcast from a downstream node, upstream node, or a peer node, discarding the first control message if it is determined that the first control message has been broadcast by a downstream node, setting a time to a random value if it is determined that the first control message has been broadcast by a peer node, and broadcasting the first control message upon expiration of the time, if no downstream node has broadcast the first control message during said time. The method further comprises determining if the first control message is in sequence using a sequence number, and discarding the first control message if not in sequence.

The first control message contains a plurality of routing parameters. The plurality of routing parameters includes a sequence number, group list, hop count to the group header node, and next hop to the group header node. The method further comprises comparing the hop count to the group header node of the first control message to a hop count to the group header node of the current node, wherein if the two hop counts are equal, then the first control message has been broadcast by a peer node. If the hop count of the first control message is less than the hop count of the current node, then the first control message is discarded. If the hop count of the first control message is greater than the hop count of the current node, then the time is canceled and status of the control message is set to "sent."

The method further includes, updating a routing table based upon at least one of said plurality of routing parameters in the first control message, receiving a second control message including at least one additional routing parameter from a group node within said local peer group, updating the routing table based upon said at least one additional routing parameter, and generating a forwarding table from said routing table when both of said updating steps are completed. A packet may be routed based on the forwarding table.

The method further comprises determining a source for said second control message, determining a direct sender of said second control message, modifying a next hop for said source via said direct sender based upon said at least one additional routing parameter in said second control message, and modifying said next hop for said direct sender based upon said at least one additional routing parameter in said second control message. After reception of said first control message, a node increments the hop count in said first control message and inserts said node's identification into the next hop to the group header node in said first control message. The node forwards said first control message after performing said incrementing and inserting, and after reception of said second control message, forwards said second control message towards said group header node.

The method further comprises determining if the first control message is received from a road side unit (RSU), and if so, then updating the routing entries of the RSU and broadcasting the first control message.

In another embodiment, the present invention is a method for dissemination of control messages between nodes within a local peer group in a wireless ad-hoc network, the method comprising: receiving a first control message from a group header node, broadcasting the first control message, receiving a second control message from a group node within the local peer group in response to the first control message, storing a sequence number of the second control message, receiving a third control message from the group header node, comparing the sequence number of the third control message with the sequence number of the second control message, and broadcasting the third control message only if the sequence number of the third control message is greater than the sequence number of the second control message minus a preset constant.

The method further comprises discarding the third control message if the sequence number of the third control message is less than the sequence number of the second control message minus the preset constant. The preset constant determines the number of control message cycles that pass before broadcasting or discarding the third control message.

The method further comprises updating a routing table based upon at least one of a plurality of routing parameters included in the first control message, updating said routing table based upon said at least one additional routing parameter included in the second control message, and generating a forwarding table from said routing table when both of said updating steps are completed.

The method further comprises determining a source for said second control message, determining a direct sender of said second control message, modifying a next hop for said source via said direct sender based upon said at least one additional routing parameter in said second control message, and modifying said next hop for said direct sender based upon said at least one additional routing parameter in said second control message. The forwarding table is used for routing packets of information. After reception of said third control message, a node increments a hop count in said third control message and inserts said node's identification into the next hop to a group header node in said third control message. The node forwards said third control message after performing said incrementing and insertion. After reception of said second control message, a node forwards said second control message towards said group header.

The method of claim further comprises, if the third control message is received from a Road Side Unit (RSU), updating the routing entries of the RSU and broadcasting the third control message.

DETAILED DESCRIPTION OF THE INVENTION

In accordance with the invention, the ad-hoc network is divided into two types of nodes: a roadside unit (hereinafter "RSU") and a moving vehicle. The RSU is a stationary node while vehicles can be moving in groups.

Figure 1:
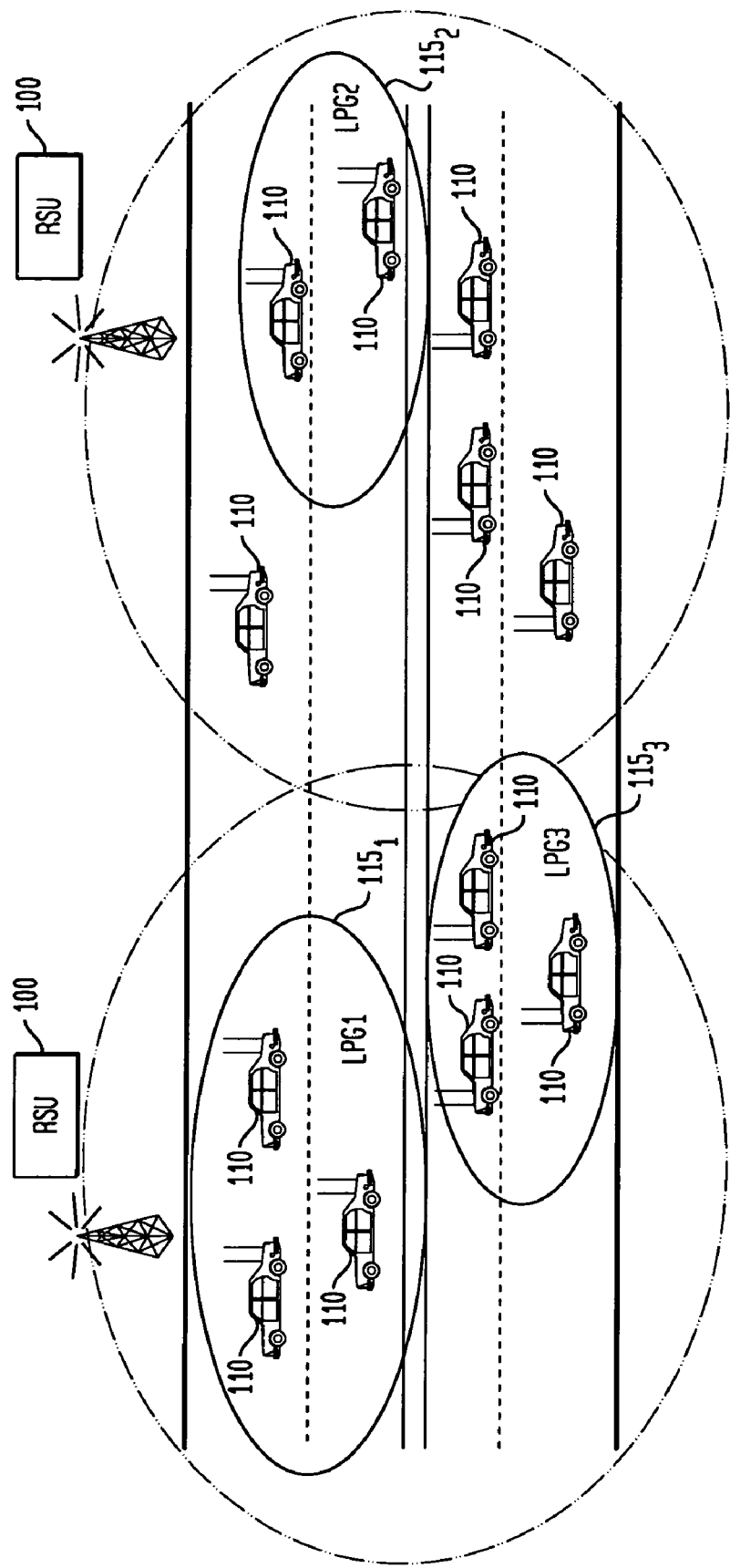
FIG. 1 illustrates an example of the ad-hoc network in accordance with the invention.

FIG. 1 illustrates an example of the ad-hoc network in accordance with the invention. The RSU 100 is located along the side of a roadway. The number of RSU 100 used in the network will depend on several factors such as the range of the radio antenna of the RSU 100, desired communication range, number of moving devices, topology of the land, the environmental conditions, traffic patterns and population density. FIG. 1 illustrates two RSUs 100. The encircled area represents the radio range for each RSU 100. Each RSU 100 can be used to communicate with moving-vehicles 110 traveling either alone or a group of vehicles.

The moving vehicles 110 can be organized into manageable groups. These groups are used to coordinate transmission of data between the nodes. The groups are built based upon the relative location of neighboring nodes or based upon a fixed location. This grouping or Local Peer Group ("LPG") is the basis for routing radio signals within a single LPG 115, as well as between multiple LPGs.

FIG. 1 illustrates three LPGs 115. Each LPG 115 consists of at least one moving vehicle 110. FIG. 1 shows that LPG 1 $115_1$ included three moving vehicles, LPG 2 $115_2$ includes two and LPG 3 $115_3$ includes three moving vehicles. The RSUs 100 can exist within the LPGs 115 and act as a special LPG node or exist as a separate node outside the LPG 115. When the RSU 100 is used in conjunction with the LPG 115 and not a node within the LPG 115, the RSU 100 can act as a boundary node for inter LPG communication. Typically, the radio coverage of one RSU 100 will be larger than the size of one LPG, i.e., more than one LPG 115 will be within the radio range of one RSU 100. The case is illustrated in FIG. 1. Accordingly, messages from one LPG 115 can be broadcast to another LPG 115 using the RSU 100. In this case, the RSU 100 will include information regarding the LPGs stored in its memory.

The moving vehicles 110 communicate with each other over the vehicle-vehicle (V-V) channels. The moving vehicles communicate with the roadside unit via the vehicle-to-roadside (V-R) channel. Additionally, the RSUs 100 communicate with each other via a R-R channel or R-B (backbone) channel. Since R-R communications would use a dedicated channel or wired backbone, the communication would not interfere with V-V or V-R communication. There are several alternatives for channel sharing between the V-V and V-R channels. In the preferred embodiment, there is a dedicated channel for V-R communication. The remaining channels will be shared for V-V and/or V-R communication. The V-R channel can be in the same RF frequency band as the other channels. Alternatively, the V-R channel can be in a difference RF frequency band allowing for different communication range and data rates.

In another embodiment, all channels are dynamically shared for both V-V and V-R. This approach allows for optimized performance. However, complexity is introduced in probing and selecting non-interfering channels.

According to another embodiment, there is a dedicated channel only assigned for V-R with others channels shared for only V-V. Alternatively, a dedicated channel for V-R is used with a second dedicated channel for V-V. The remaining other channels will be shared for V-V and V-R communications. For purposes of the proceeding description of the invention, the preferred embodiment of the channel assignment will be used. The RSU 100 can have many functions such as a router, an applications server or a combination thereof.

There are several types of LPGs 115, stationary LPGs, dynamic LPGs, and hybrid LPGs. A stationary LPG is defined by a specific location or area, i.e., if a node is in an area defining, e.g., area A, the node is in LPG A. If a node is in different area, e.g., area B, the node is in LPG B and so on. The particular size of a stationary LPG is a design choice, depending on various factors, e.g., range of the radio antenna, communication range, number of moving devices, topology of the land, the environmental conditions, traffic patterns and population density. The location and size of the stationary LPG is fixed. However, each stationary LPG might be of a different size since traffic patterns and population (moving vehicles 110) density is different in different places. If an RSU 100 is within the predefined LPG 115, the radio range of the RSU 100 will define the size of the stationary LPG.

By using an RSU 100, a moving vehicle 110 will be able to detect the location of the stationary LPG by hearing either a heartbeat control message from the RSU 100, or a beacon from the APs 330. The moving vehicles 110 will change stationary LPGs as the moving vehicles 110 change their position. Alternatively, a moving device will include a database of LPGs 115 and their locations. In another embodiment, if there are multiple RSUs 100 within a given area, at least one RSU 100 can provide information regarding the relative position or locations of other RSUs 100 in the neighborhood to facilitate handoff between multiple LPGs 115 by enabling the moving vehicle 100 to locate an LPG 115 quickly.

Stationary LPGs have a significant advantage of supporting integration with wireless infrastructure to provide backbone access or inter-LPG communication even when some LPGs 115 are empty or do not have many moving vehicles 110 within the LPG 115. Each stationary LPG is assigned a unique identifier to facilitate communication. Since every stationary LPG area is well defined, formations and naming the LPG 115 is easier than the dynamic LPG. Additionally, rules regarding merging and splitting an LPG 115 are not a concern when using a stationary LPG.

A second type of LPG 115 is a dynamic LPG. As opposed to a stationary LPG, a dynamic LPG is formed based upon the radio coverage of neighboring nodes so that a node can coordinate communications without worrying about exact location of the other nodes.

Since the dynamic LPG is formed based on radio coverage, moving vehicles 110, within the LPG 115 can always communicate with each other and to an RSU 100 via single or multiple-hop transmission. One node within the LPG 115 is able to control the size of the dynamic LPG, in order to keep the number of nodes within each LPG 115 or, alternatively, the number of radio hops from this node to the edge of the dynamic LPG reasonably small so that the communication can be performed efficiently with low latency. This node is called a group header (GH) as will be described later in detail. Additionally, in contrast with a stationary LPG, the dynamic LPG ensures that communication is always possible within each LPG 115. In a dynamic LPG, an LPG 115 can be formed outside the RSU 100 radio range, unlike with stationary LPGs.

In one embodiment, an ad-hoc peer-to-peer network can be created from one or more stationary LPG or one or more dynamic LPG. In another embodiment, the ad-hoc peer-to-peer network can be created from both stationary LPGs and dynamic LPGs as a hybrid LPG network. A Hybrid LPG network combines the benefits of the stationary LPG and dynamic LPG while removing the problems caused by each taken separately.

The hybrid approach would take advantage of the roadway topology. Specifically, when infrastructure is not available, a dynamic LPG is used to form the network when infrastructure becomes available in some areas, a stationary LPG can be used to form the network with dynamic LPGs and infrastructure. For example, infrastructure, such as roadway infrastructure, would enable roadway-vehicle communication or roadway-assisted communication.

In one embodiment, the RSU 100 can be a node within the LPG 115 and perform similar network functions as the moving-vehicles 110. The RSU 100 can join an LPG 115 as either a Group Header (GH) node or a Group Node (GN). A GH is a moving device or node within the LPG 115 that is designated to maintain and control the LPG 115 without any ordering of the nodes or any infrastructure. Typically, there is only one GH within an LPG 115. All other nodes within the LPG 115 are a general node or a group node ("GN"). The ON joins the LPG 115 through the GH.

Each RSU 100 is capable of operating as a GH or GN in addition to a router and application server as described above. As such, each RSU 100 includes elements or means and networking protocols that allow the node to function or operate as a GH or GN, respectively. Therefore, even when an RSU 100 operates as either a GH or GN, all of the structural elements or means are present for both the GH and GN, but only specific elements function based upon the mode of operation. An RSU 100 will therefore include both hardware and software to provide the functionality of a GH or GN.

Figure 2:
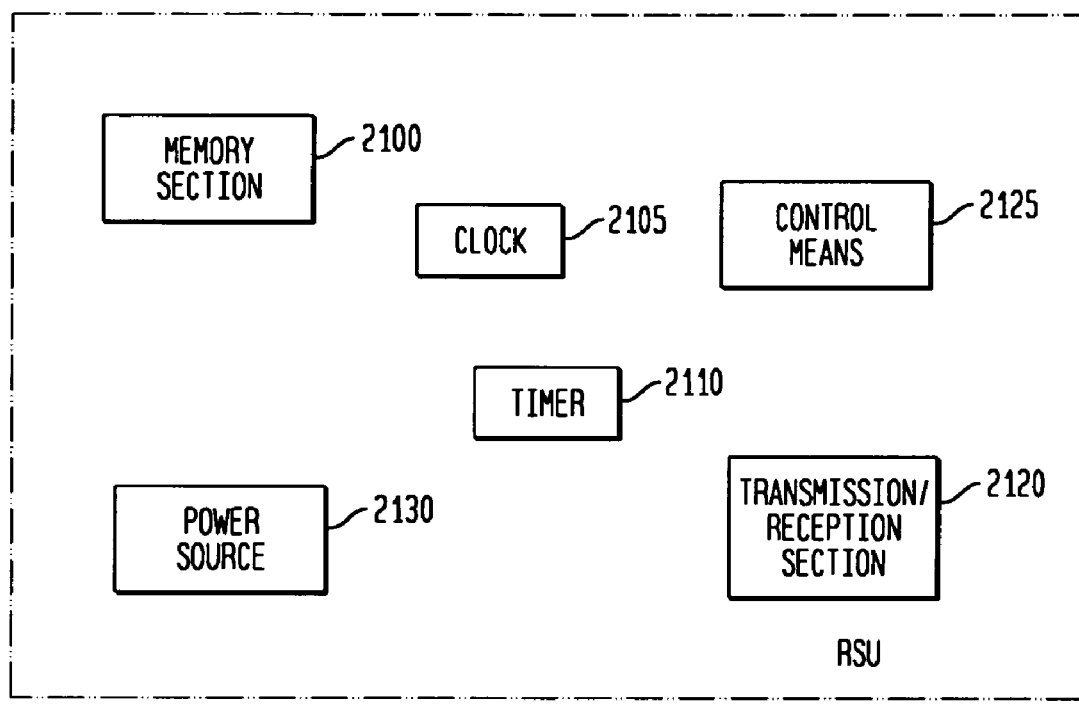
FIG. 2 illustrates a block diagram of basic elements of a Road Side Unit (RSU), according to an exemplary embodiment of the present invention.

FIG. 2 illustrates a block diagram of basis elements of the RSU 100. The RSU includes a memory section 2100, a clock 2105, a timer 2110, a transmission/reception section 2120, a control means 2125 and a power source 2130. The memory section 2100 can be any type of memory including DRAM, SRAM or Flash. In a preferred embodiment, the short-term memory is cache. The memory section 2100 stores information regarding the LPG such as the Group ID (GID), Group Header ID, the group listing, a predetermined maximum LPG size, the number of nodes in the LPG, and other types of control parameters.

The clock 2105 is used to maintain the timing for the RSU 100. Specifically, the clock 2105 functions as an internal clock and is used as a basis for setting a timer 2110. The timer 2110 is used to determine when to broadcast the various messages, i.e., determines a heartbeat interval (T) in the case of a GH or a reply message in the case of a GH. The control means 2125 or microprocessor controls all of the processes of the RSU 100 including generation of the message, routing, and timer. The transmission and reception section 2120 in combination with the control means 2125 is responsible for creating or generating the message from data, which is stored in the memory section 2100.

The RSU 100 periodically transmits a beacon or heartbeat control message to all moving vehicles 110 and other RSUs within the RSU's radio range. This period is a fixed interval. The value of the heartbeat interval (T) is selectable based on design or operational needs.

When an LPG 115 moves near an RSU 100, a GH is elected based upon header resolution protocols. A moving vehicle that is GH of an LPG 115 sends out a heartbeat control message on both the V-V and V-R channels. The RSU 100 acting as a GH as well only sends out its heartbeat on the V-R channel. When more than one GH sends a heartbeat control message, header resolution occurs. This is to avoid having multiple GHs within the same LPG 115, since multiple GHs in the same LPG 115 will result in redundant (potentially even confusing) control signals being transmitted or broadcast within the LPG 115 and waste bandwidth and capacity. Header resolution functions to select one GH from at least two GHs.

The unicast routing protocol is based upon creating a routing table within each node. The routing table includes at least a destination and a next hop for messages or messages. All moving vehicles 110 in an LPG 115 perform routing functions and help other vehicles to communicate with either a single hop or a multi-hop. The intra-LPG routing table is constructed by exchanging control messages in a broadcasting mode using LPG formation messages. No additional control messages are needed for unicast routing. The same control messages that are used for LPG 115 formation are used for creating, maintaining and updating the routing table for the routing protocol. The routing table is used for intra-LPG routing. The LPG identifier is embedded in every control message to prevent propagating foreign control messages to unnecessary nodes. All foreign control messages will be terminated or not relayed.

The control message messages are the heartbeat (HB) from the GH and the membership report (MR) from a GN. The heartbeat control message defines the region of an LPG. A heartbeat control message followed by a membership report constitutes one control message cycle.

In another embodiment described in the '047 application, the LPG network is capable of supporting multicast message functionality. In unicasting, because a sending node (e.g., the witness of the accident) sends or directs a message to one particular receiver, multiple messages are needed to send the same information to number receivers. This results in the consumption of a large network bandwidth and message delays. In multicast transmission, the sender does not generate duplicate copies of the message; it sends one message to all the recipients. The network bandwidth is significantly saved with multicasting.

HB Message

Figure 3:
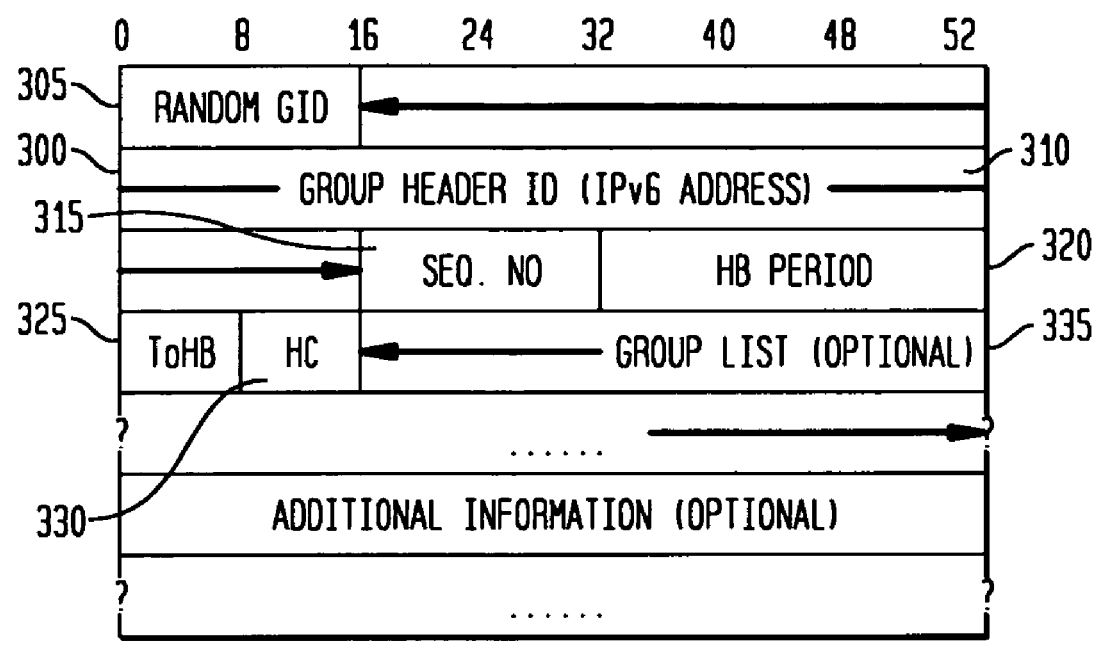
FIG. 3 illustrates an example of the format for a Heartbeat control message, according to an exemplary embodiment of the present invention.

FIG. 3 illustrates an example of the format for the heartbeat control message 300. The heartbeat control message 300 includes a unique identifier that includes both a LPG identifier or GID 305 and the Group Header ID 310.

A GID 305 and the Group Header ID 310 identify each LPG 115. There are several possible formats for the GID 305. In an embodiment, the GID 305 can be an identification number randomly selected for the LPG 115. Alternatively, the GID 305 can be an identification number assigned based upon an order of formation of the LPG. For example, the first LPG can have the GID 305 of LPG1, the second would be LPG2 and so on. However, as the GH changes, the GID 305 would change as well, and would result in a node not being able to tell if its LPG changes or just the ID for the LPG 115. On the other hand, the GID 305 can be fixed to the original ID when a GH leaves. However, this might lead to GID 305 duplication when a single LPG splits. Two or more groups will have the same GID 305. In an embodiment the GID 305 is encoded based upon both LPG ID and GH ID numbers to uniquely identify the LPG 115.

A GH is given a Group Header ID 310. Initially, the GID 305 is tied to the Group Header ID 310. Therefore, the Group Header ID 310 initially is used as a portion of the GID 305, but as the GH changes, the GID 305 changes to include the new Group Header ID 310. Each GH is assigned a Group Header ID 310. The Group Header ID 310 is assigned based upon a (public or private) IP address. As depicted in FIG. 3, the Group Header ID 310 is an IPv6 IP address. In another embodiment, the Group Header ID 310 can be an IPv4 address.

The heartbeat control message also includes a sequence number (Seq. No.) 315. The Seq. No. 315 is used to track the order of the heartbeat control message to determine if a received heartbeat control message 300 is new or fresh. A GN remembers the Seq. No 315 of the received heartbeat control message. A new or fresh heartbeat control message is indicated by a first heartbeat control message with the next Seq. No. 315. The sequence number 315 is also used to determine which heartbeat control message should be relayed (to the next hop nodes), i.e., a first come relay only (FCRO) strategy can be used. Only new (i.e., fresh) heartbeat control messages should be relayed. A node remembers the previous sequence number and then compares the incoming sequence number of the heartbeat control message to determine if the heartbeat control message is new or fresh. If the Seq. No. 315 of the heartbeat control message with the proper GID 305 is greater than the currently stored sequence number, it is a new or fresh heartbeat control message 300 and is then relayed when FCRO is used. The sequence number previously stored in the GN will be discarded and replaced with the new Seq. No.

The heartbeat control message 300 further includes information regarding the heartbeat period (HB period) 320. This period is a fixed interval (T). The value of the interval (T) is selectable based on design or operational needs. The MB period 320 indicates to all GNs when the next heartbeat control message will be broadcast. If a GN does not receive a heartbeat control message within the MB period 320, the GN will transmit a new heartbeat control message such that a heartbeat control message is continuously transmitted. If the original GH is still in the LPG 115, then header resolution will occur. To reduce the control overhead, the GH can adjust the HB period 320. The adjustment can be based upon, size of the LPG, location, load, speed and number of nodes within the LPG.

The heartbeat control message 300 will also include the type of heartbeat control message, e.g., heartbeat with complete group list, incremental group list or no group list. In one embodiment, the heartbeat control message will include a complete group list in every message. Using a complete group list is the most accurate way to control routing and maintain a correct list of group members; however, there is a significant amount of bandwidth needed for the heartbeat control message with a complete group. The heartbeat interval (T) can be adjusted to reduce the control overhead. In another embodiment, every n-th heartbeat control message will include a complete group list. For example, each third heartbeat control message includes a complete group list. This will reduce the bandwidth for the average heartbeat control message. However, since most of the nodes within the LPG 115 are moving at a rapid pace, the received group list might be stale. In other words, by the time the new group list is received by a node, several members of the group might be in another LPG 115. In another embodiment, a progressive or incremental group list can be distributed. A group list will only be distributed when there is a change in the membership in the group list. Progressive or incremental group lists may also suffer from a stale membership list.

Alternatively, the type of heartbeat control package can be a hybrid group list update. A progressive group list can be included in the heartbeat control messages when there is a change in membership and additionally a complete group list can be included every n-th heartbeat control message. ToHb 325 will indicate the type of heartbeat control message. The type of heartbeat control messages is influenced by the topology change rate of the LPG 115 and frequency of broadcast of the heartbeat control message. As the topology change rate of an LPG 115 increases, there is a greater need for a complete group list being included in all heartbeat control messages. As the frequency of broadcast of the heartbeat control message increases, the need for a complete group lists being included in all heartbeat control messages decreases.

The heartbeat control message will include the hop count (HC) 330 from the GH. Initially, the HC 330 is set at a predetermined value, e.g., 1. Every time the heartbeat control message is relayed by a node, the relay node increases the HC 330 value by 1, i.e., HC=HC+1. The HC value can be used to limit the LPG size, to indicate the staleness of the information within the heartbeat control message and to control routing of the control messages to reduce overhead. For each LPG, there is a maximum hop count for routing, e.g. 10. Once the HC is incremented to the maximum hop count, the control message, e.g., the heartbeat control message will not be relayed.

The hop count can also be used for a relay strategy. In an embodiment, the heartbeat control message can be relayed if the heartbeat control message has the lowest hop count. This method will guarantee the correct hop count from the GH, however, there will be a waiting delay. Since the node has to determine the lowest hop count for the heartbeat control message, the node has to wait until the node receives the heartbeat control message from all upstream nodes before the node relays the heartbeat control message. Accordingly, a combined relay strategy can be implemented using both the lowest hop count and first come relay only strategy set forth above. A heartbeat control message will be relayed using the first come relay only strategy until a node receives a lower hop heartbeat control message. When a node A forwards the heartbeat control message it will include its ID information in the message so that next hop nodes know who relayed the heartbeat control message. The node forwarding the message (node A) also then becomes the MR relay node (to send the MR towards the GH) for next hop nodes, which received the heartbeat control message for the first time from node A.

The usage of a maximum hop count, HC 330 and Seq. No. 315 prevent the infinite duplications of flooding of the control message within the LPG 115. According to one embodiment of the present invention, when a node overhears a flooding relay whose hop count (HC) from the flooding source is smaller than its own, the node gives up relaying the flooding message. This method is further described in FIG. 5. When the node receives a new heartbeat control message 300, it waits for a set time (defined by an HBWaitSend timer) before relaying the heartbeat. If, during this time, a downstream node or a peer node rebroadcasts the heartbeat, the HC of the rebroadcasted heartbeat is compared to the current (stored) HC 330. If the received HC is smaller than the current HC 330, the message is discarded so as not to broadcast the heartbeat unnecessarily. If the two HC are the same, the rebroadcasting node is a peer node, and the present node increases or resets the HBWaitSend timer, to increase the chances of it not being a key node. If the received HC is greater than the current HC, the current HBWaitSend timer is cancelled and the heartbeat is sent. See FIG. 5 for more detail.

In another embodiment, a Relay Node (RN) is selected to build an efficient control message relay tree. This method uses the Seq. No. 315 of the heartbeat control message 300 to determine whether or not to relay the message. A relay node is one that relays at least one Member Report (MR) to the upstream node or GH. This method is further described in FIG. 6. Generally, a heartbeat control message 300 triggers a Membership Report (MR) from a node. The contents of the MR are described in the next section and FIG. 4. Whenever a node relays an MR, the node stores the most recent sequence number of the MR (corresponding to the Seq. No. 315 of the HB), duplicates the MR, replaces the next hop, and broadcasts the MR. A subsequent HB 300 is received and the Seq. No. 315 is compared to the stored Seq. No. of the MR. Since the delivery of the MR automatically selects Relay Nodes (as described in the '047 application), comparing sequence numbers ensures that only selected Relay Nodes deploy subsequent HB control messages, thus reducing the amount of unnecessary control messages during HB flooding.

As set forth above, a heartbeat control message can also include a Group List 335. A Group List 335 can include information regarding the members of the LPG 115, such as the number of members in the LPG 115, IP addresses for each number, the hop count from the GH, and a classification.

A classification can be a code that references a relative direction from the GH node, e.g., uplink, downlink and peer. A peer classification indicates that a node is within the same wireless coverage area from the GH, i.e., all of the peer nodes have the same hop count from the GH. Upstream nodes are determined by the heartbeat control message. Downstream nodes are determined based upon a membership report (MR). Upstream transmission represents communication towards the GH and downstream transmission represents communication away from the GH. This classification is a relative term. Each GN can classify its neighbors into three different classes. If the membership report of another GN has 1 less hop count (HC) than the HC of the GN, the GN is an upstream node. If the HC is the same with its own HC, the GN is a peer. If the HC is 1 greater than its own HC, the GN is a downstream node.

Figure 4:
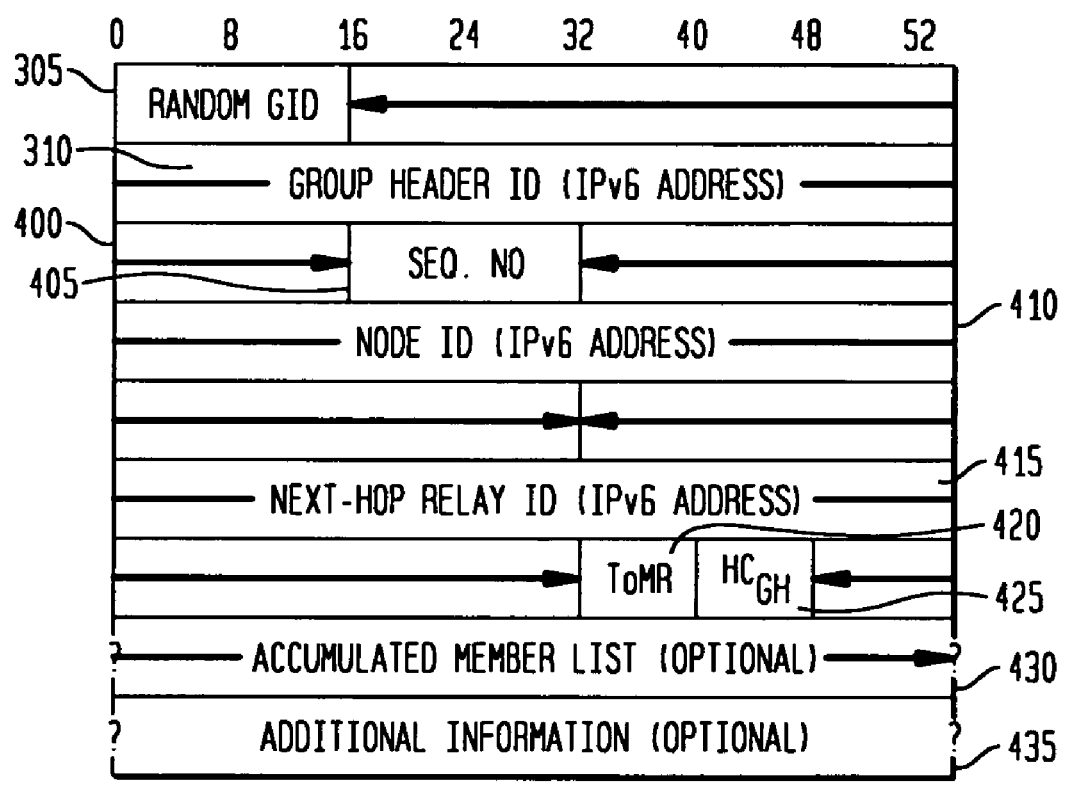
FIG. 4 illustrates an example of the format for a Member Report control message, according to an exemplary embodiment of the present invention.

FIG. 4 illustrates a membership report (MR) 400. An MR 400 is a control message F broadcast by the GN for receipt by the GH. The MR includes collectable routing information such as a membership list, downstream node identifications and next hop for downstream nodes. An MR includes some of the same information as the heartbeat control message 300: the GID 305 and the Group Header Id 310. The MR 400 will also include an MR Seq. No 405. The MR Seq. No. is similar to the Seq. No 315 for the heartbeat control message 300 and is used to maintain order of the MR's. The MR. Seq. No. 405 is the MR order for one particular node. Typically, the MR Seq. No. 405 has the same value with the Seq. No. 315 of the heartbeat control message 300 that triggered the MR 400.

Thus, in one embodiment of the present invention further described in FIG. 6, the Seq. No 405 of the MR 400 is stored in the memory of the current node, and is compared to that of a subsequent heartbeat control message. If the Seq. No. of the incoming message is greater than the presently stored Seq.

No. 405 minus a preset number k, then the node is a relay node. The constant k introduces a relaxation of k cycles, to implement redundancy in order to prevent the LPG from breaking up.

The Node ID 410 of the originating node is also included in the MR 400, i.e., node that generated the MR. The MR also includes Next-hop relay ID 415. The Next-hop relay ID 415 is relay instructions for the MR 400 towards the GH. The next hop information is determined directly from the received heartbeat control message 300. When a node receives a new or fresh heartbeat control message, it recovers the previous relaying node's identification from the IP layer and MAC layer before any message processing. The previous relaying node's identification is stored in memory and used as the Next-hop relay ID 415 for the MR. When a node forwards a heartbeat control message, the node includes its ID in the message. The receiving next hop node will store this ID when the node receives a new or fresh heartbeat control message, as the next hop relay ID to reach the GH. A new or fresh heartbeat control message is the one that has a newer sequence number with lowest HC.

The MR 400 also includes a "Type of MR indicator" ToMR 420. There are two types of MRs: a single member and aggregated multiple member report. A single member MR only includes an MR from the originating node. An aggregated multiple member report includes the MR of more than one node. The aggregate report can be used to reduce the overhead and bandwidth needed for control messages. One MR is sent containing multiple MRs.

Additionally, the MR can include a Hop count from the GH ($HC_{GH}$) 425. ($HC_{GH}$) 425 is the HC value from the GH to the originating node of the MR. In another embodiment, the MR can include an accumulated membership list 430 and other additional information 435. The accumulated membership list 430 will include the IP address of the member of the LPG, number of members and corresponding hop counts.

The MR 400 can be delivered or relayed to the GH using a reverse path or reverse flooding method. A reverse path method relays the MR towards the GH using the same path that was used for relaying the heartbeat control message 300. When an MR is relayed, the relaying node replaces the NEXT-Hop Relay 415 with its next hop towards the GH. Only the node that has the corresponding ID relays the MR message. This method assumes symmetry in transmission. If asymmetry links are present, the Reverse flooding method is used, i.e. every node between the originating node and the GH relays the MR. This is the selection procedure that may be used to select Relay Nodes (RN) for subsequent heartbeat control message delivery.

Each node uses both the heartbeat control message 300 and the MR 400 to create a routing table that can be used as a forwarding table for LPG based routing. In the preferred embodiment, each heartbeat control message includes a complete group list and is responded to, with MR, by all GNs within the LPG 115. The heartbeat control message is relayed using a first come relay only method and the MR is relayed towards the GH using the reverse path method as a single MR.

Light Suppression-Based Efficient Flooding

Figure 5A:
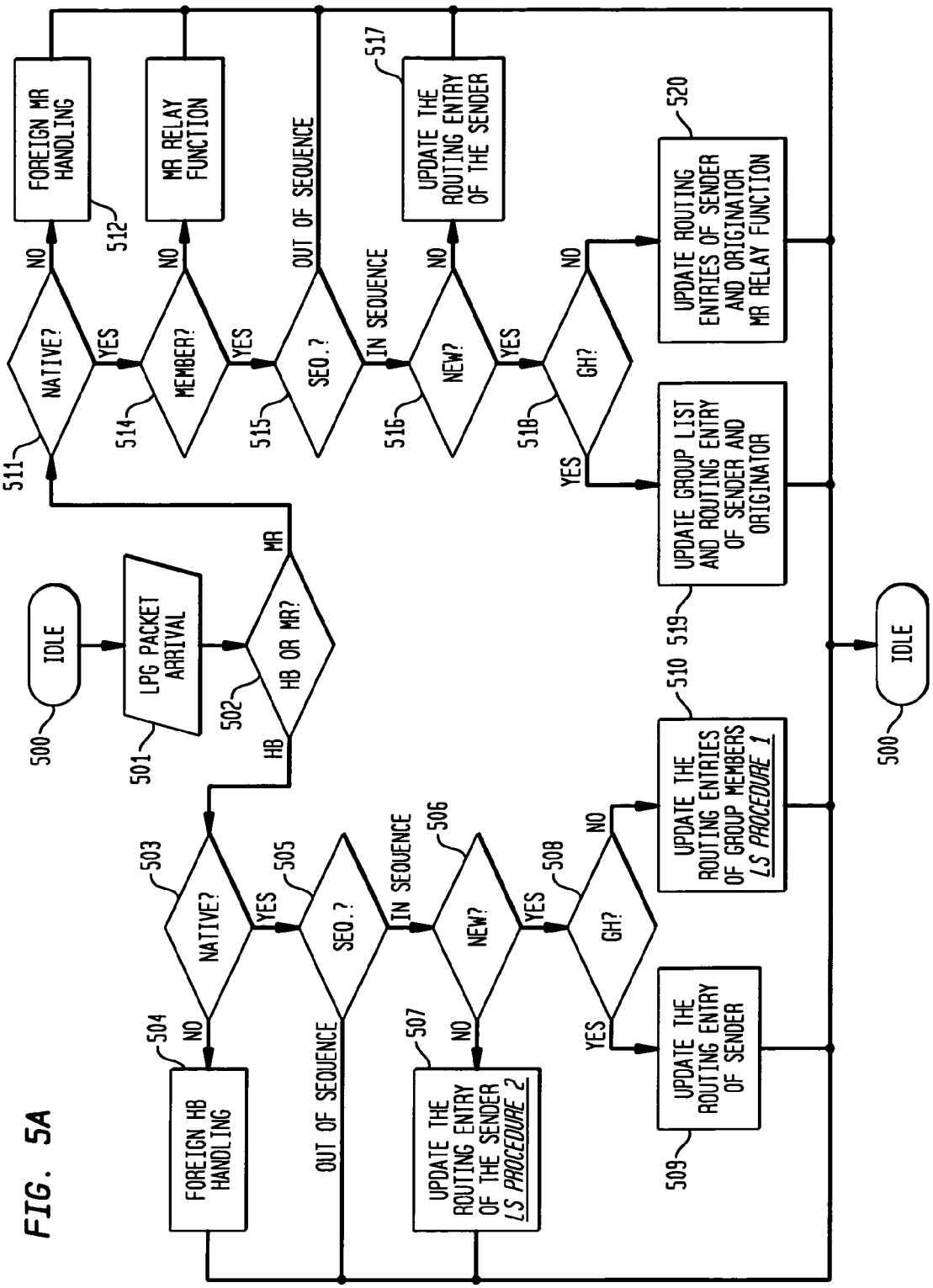
FIGS. 5A, 5B, 5C and 5D illustrate a Light Suppression method for processing control messages, according to an exemplary embodiment of the present invention

A suppression-based efficient flooding mechanism utilizes a Light Suppression (LS) technique to reduce the number of flooding relays by giving up the broadcasting of a flooding message when a node observes downstream relay of the same flooding message. FIG. 5A illustrates this method. Initially, each node is idle step 500. When a message arrives, step 501, the node determines whether the message is a heartbeat control message 300 or an MR 400, at step 502. Depending on the type of control message, the node performs special message processing. If the control message is a heartbeat control message 300, the node processes the message starting with step 503. The node determines if the message is native, step 503. A message is native if the message is for the same LPG 115, i.e., the message has the same GID 305. The node will compare the GID 305 with the group identification stored in memory. If the GID 305 does not match the identification stored in memory, the node will initiate Foreign HB handling, at step 504. Typically, foreign HB handling will result in the node discarding the message. If the GID matches the identification stored in memory, the node will then determine if the heartbeat control message 300 is in sequence. The node will compare the Seq. No. 315 with the sequence number in memory. If the Seq. No. 315 is less than the value stored in memory, the node will ignore the message, at step 505. If the Seq. No. 315 is greater than the value stored in memory, the heartbeat control message 300 is in sequence and the node will then determine if the heartbeat control message is new, at step 506 by comparing the current sequence number to the last stored sequence number.

Figure 5B:
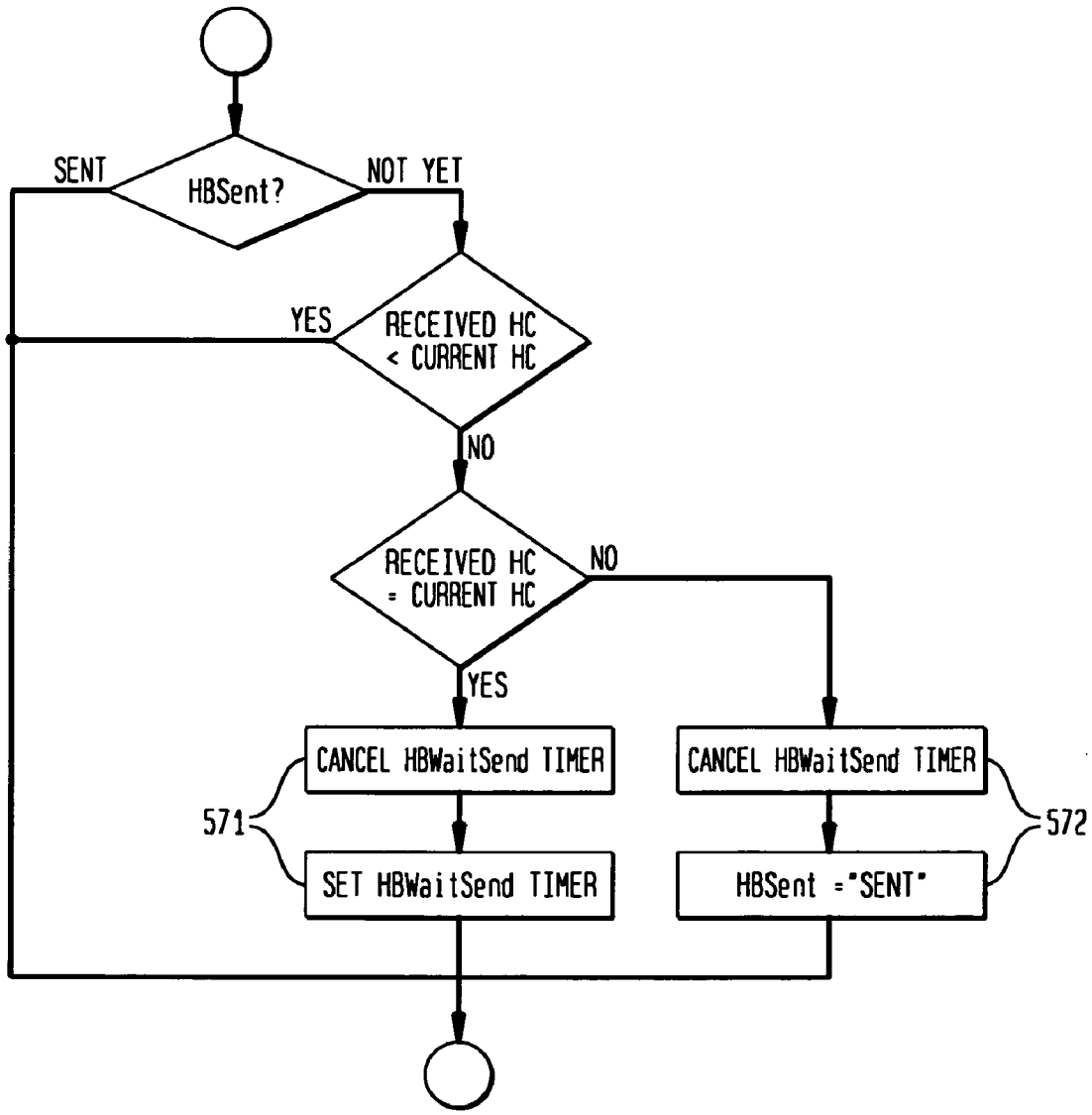
Figure 5C:
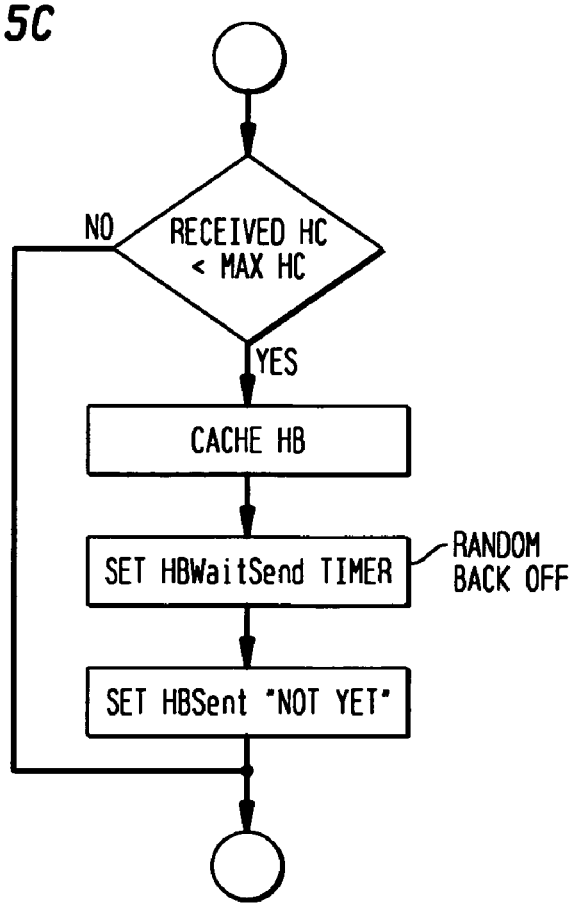
Figure 5D:
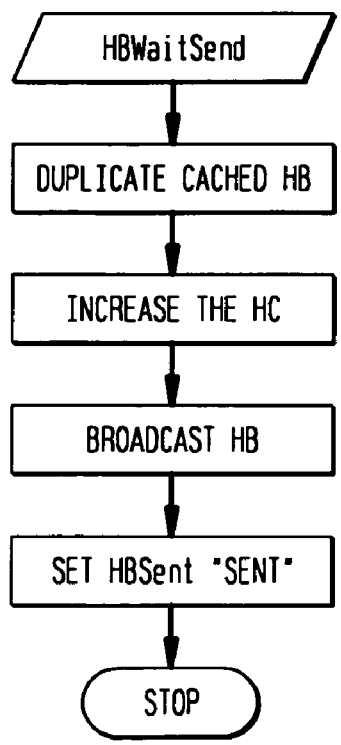

If the node determines that the message is not new, the heartbeat control message 300 undergoes a light suppression process step 507 that is highlighted in FIG. 5B. If HB 300 is not new and has been sent by the node or a downstream node, then it is discarded. However, when a node receives the HB 300 by a peer node whose hop count (HC) 330 from the source is the same value as its own (peer node), the node prolongs the waiting time (Step 571) to increase the chances of not being a key node. Similarly, if the message is new, it is still not rebroadcast immediately but is cached for a random time using an HBWaitSend timer (shown in FIG. 5C) or until a downstream node rebroadcasts the HB. When HB is rebroadcast in steps 572, HBSent becomes true, and the HB is discarded.

Referring back to FIG. 5A, if the node determines that the message is new, then depending on whether the node is a GH or GN, the node will perform one of two functions. The determination of the node type is performed at step 508. If the node is a GH, then the node will update the routing entry of the sender, at step 509, and the heartbeat control message 300 is not relayed and the node will become idle 500. However, if the node is a GN 1500, then the node will update the routing table for all group member entries and process the HB control message 300, at step 510, as described above and in FIG. 5C. By waiting for the HBWaitSend timer until a potential peer or downstream node rebroadcasts the HB, the node can be lightly suppressed, ensuring that no unnecessary HB control messages are broadcasted.

If the control message is an MR 400 the node processes the message starting with step 511. The node determines if the message is native, step 511. The node will compare the GID 305 with the group identification stored in memory. If the GID does not match the identification stored in memory, the node will initiate Foreign MR handling, at step 512. If the GILD matches the identification stored in memory, the node will then determine if the node that sent that MR 400 is a member of the LPG 115. The node will compare the Node ID 410 with a membership list stored in memory. If there is no match, then the node will only relay the MR 400, at step 514. The MR will be relayed so that a new group node can join the LPG without having to wait for a complete heartbeat cycle. If the node that sent the MR is not listed in the join list, the node can be considered a joining node. There are no routing entries in the routing table for a joining node. In one embodiment, the node can forward the MR towards the GH. The node will not update any entry in the routing table. In another embodiment, the node can add the originating node (of the MR) to the destination list, i.e., reserve a routing entry for the originating node. The node can save the relaying node information as the next hop and when the new heartbeat control message 300 is received with the originating node as a member, the node can automatically update the r routing table with the information already stored in memory. When the new routing entry is finalized, the originating node can be classified as a downstream node. Further, the $HC_{GH}$ 425 can be saved, and compared with the HC 330 of the new heartbeat control message, the result of said determination being used to decide whether or not to forward the new heartbeat control message. This relay node procedure is further described in FIG. 6.

If there is a match, then the node will determine if the MR 400 is in sequence, at step 515. The node will compare the MR Seq. No 405 with the sequence number in memory. If the MR Seq. No 405 is less than the value stored in memory, the node will ignore the message and become idle 500. If the MR Seq. No 405 is greater than or equal to the value stored in memory, the MR 400 is in sequence and the node will then determine if the MR is new, at step 516 by checking whether the node has already received the MR from the originator with the current sequence number (by comparing with the last stored sequence number). If the node determines that the message is not new, only the routing entry of the sender is updated, step 517. The MR is not relayed. If the node determines that the message is new, then depending on whether the node is a GH or GN, the node will perform one of two functions. The determination of the node type is performed in step 518. If the node is a GH, then the node will update the routing entries of the immediate sender and originator, at step 519. The MR 1800 is not relayed and the node will become idle 500. However, if the node is a GN, then the node will update the routing table for sender and originator and relay the MR, at step 520. Further, the sequence number 405 of the MR 400 will be saved and compared to the subsequent heartbeat control message 300. This procedure is described in FIGS. 6A-C.

Relay Node-Based Efficient Flooding

A relay-node based efficient flooding mechanism selects Relay Nodes (RN) to form an efficient flooding tree for control message delivery. RNs are nodes that relay at least one control message, for instance a Membership Report (MR) to the upstream node in "k" previous control message cycles. The upstream node may be the group header (GH) for the LPG.

Figure 6A:
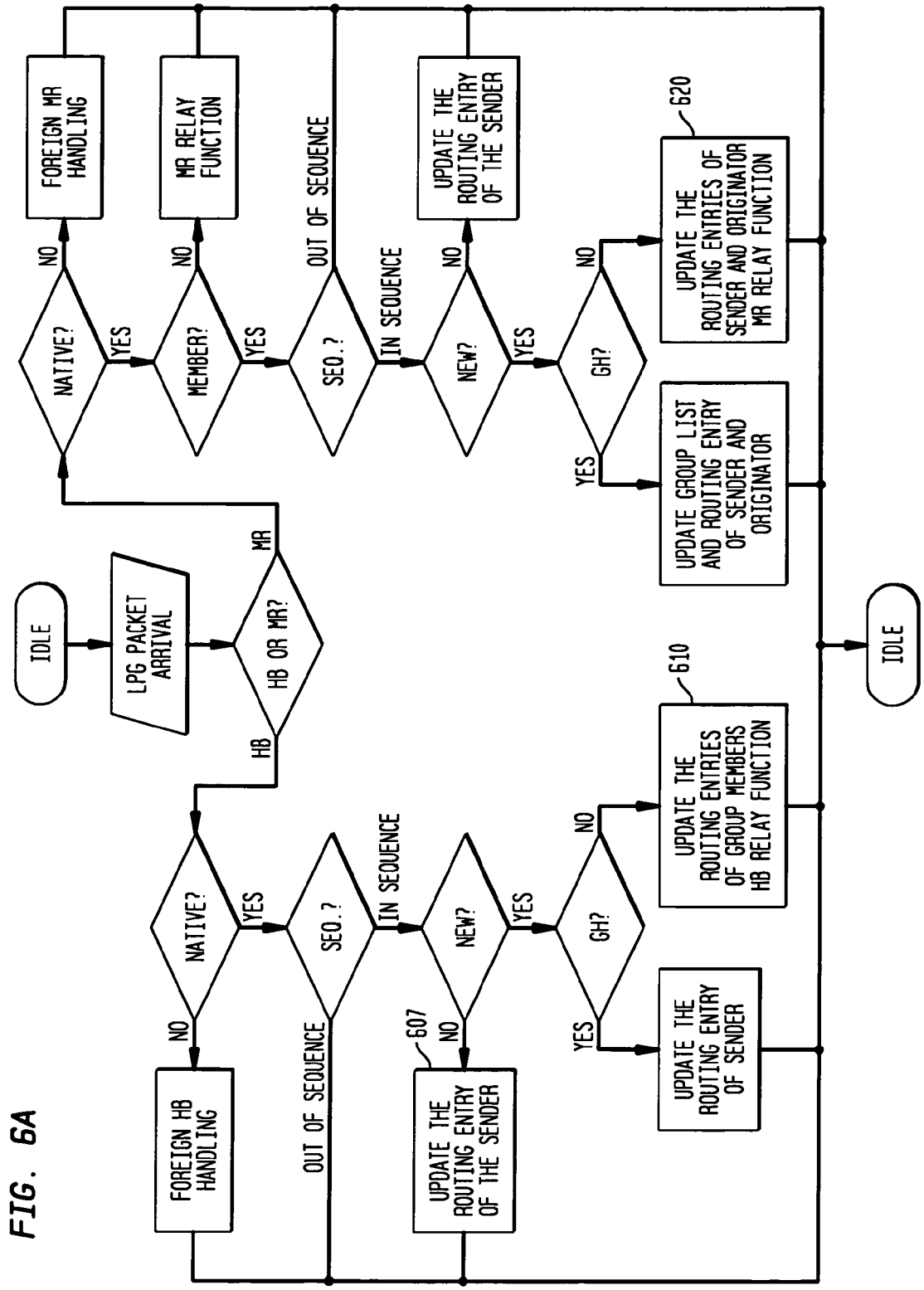
FIGS. 6A, 6B, and 6C illustrate a Relay Node method for processing control messages, according to an exemplary embodiment of the present invention.
Figure 6B:
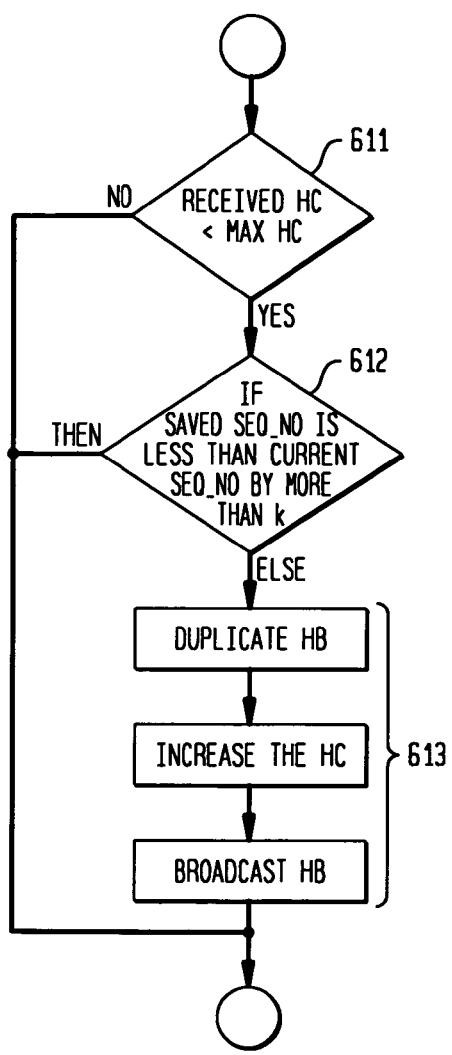
Figure 6C:
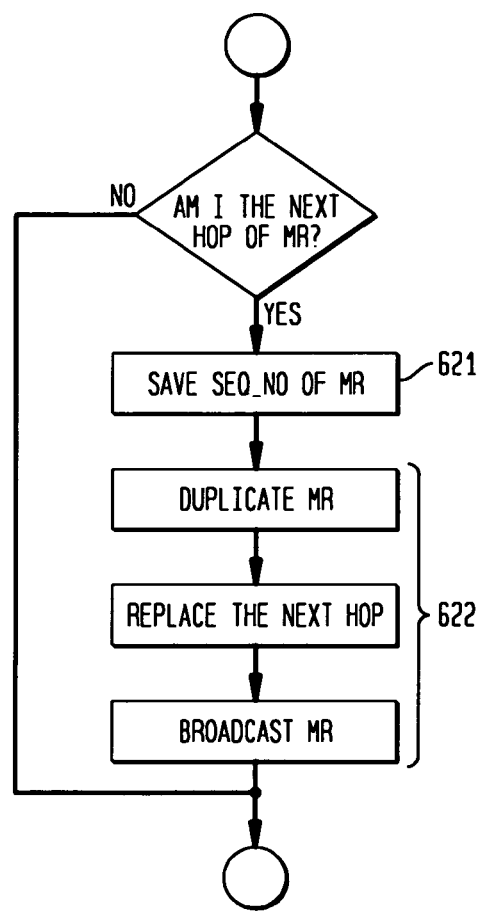

FIGS. 6A, B, and C show this process, according to an exemplary embodiment of the present invention. The procedure for the most part parallels that of FIG. 5 and will therefore not be described in detail. The significant differences occur in steps 607, 610, and 620. Step 607 is different from the light-suppression method in that HB delivery is not contingent upon comparing hop counts with prior HBs 300. If the node determines that the message is not new, only the routing entry of the sender is updated, step 607. The heartbeat control message is not relayed. In step 620, the MR relay function is modified to reflect the steps shown in FIG. 6C. If the node is the next hop of the MR 400, the Seq. No. 405 of MR 400 is stored in step 621, and the MR relay function 622 is invoked as usual. Then, upon arrival of a subsequent heartbeat control message 300, upon reaching step 610 the procedure in FIG. 6B is invoked. If the HC 330 of the HB 300 is within the upper limit in step 611, then a comparison of Seq. Nos. 315 and 405 and takes place to determine whether or not to broadcast the HB 300, in step 612. Specifically, if the sequence number 315 of the incoming HB is greater than the sequence number 405 of the previous MR 400 minus a preset constant, then the HB 300 is broadcast as usual, in steps 613. However, if the sequence number 315 of the new HB is less than the sequence number 405 of the MR minus a preset constant k, then the HB is discarded. The constant k may be any number set to define the number of cycles of control messages. k may be implemented as a dynamic parameter depending on the frequency of HB messages and other factors. k may vary but positive results have been shown with setting the value to 5-10 cycles.

Further, to improve efficiency for relaying the messages and to ensure timely delivery a passive acknowledgement may be added. In the above-described embodiment, there is no acknowledgement from a node that the HB was received. Thus, to avoid structural breakdown due to HB losses, the node may wait a set time for a passive ACK from recipients of the HB transmitted from other nodes. When said passive ACK is not received, the node could issue a second HB relay, triggering blind flooding as a failsafe mechanism.

Using the RSU as a GH

The role of the RSU affects the unicasting performance of LBR. As mentioned before, the RSU may be used as a GH. When the RSU is made a GH, all the vehicles within the region of RSU LPG belong to the LPG. In other words, passing vehicles may discard the LPG that they were a member of. In this case, a static LPG (RSU LPG) would not initiate LBR, and it only forms the route to the RSU. The static LPG (RSU LPG) does not re-grouping the vehicles, however, the RSU issues a special HB that does not trigger an MR. The special HB is used only for constructing routes to the RSU. When the RSU needs a route to a vehicle, it can construct a route to the vehicle by using LPG control messages (HB and MR) of mobile LPG.

Figure 7A:
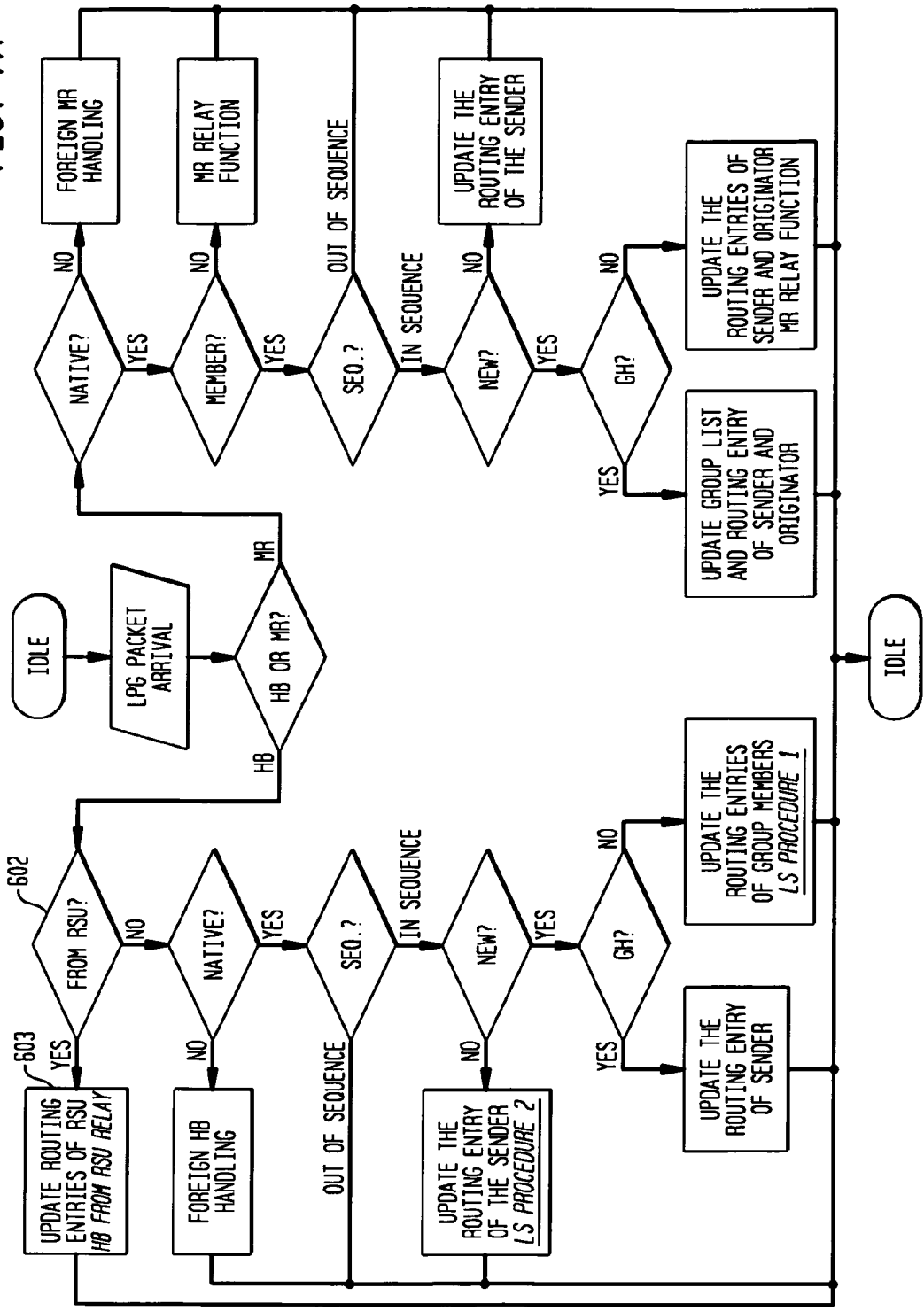
FIGS. 7A and 7B illustrate a method for processing heartbeat messages from a RSU, according to an exemplary embodiment of the present invention.
Figure 7B:
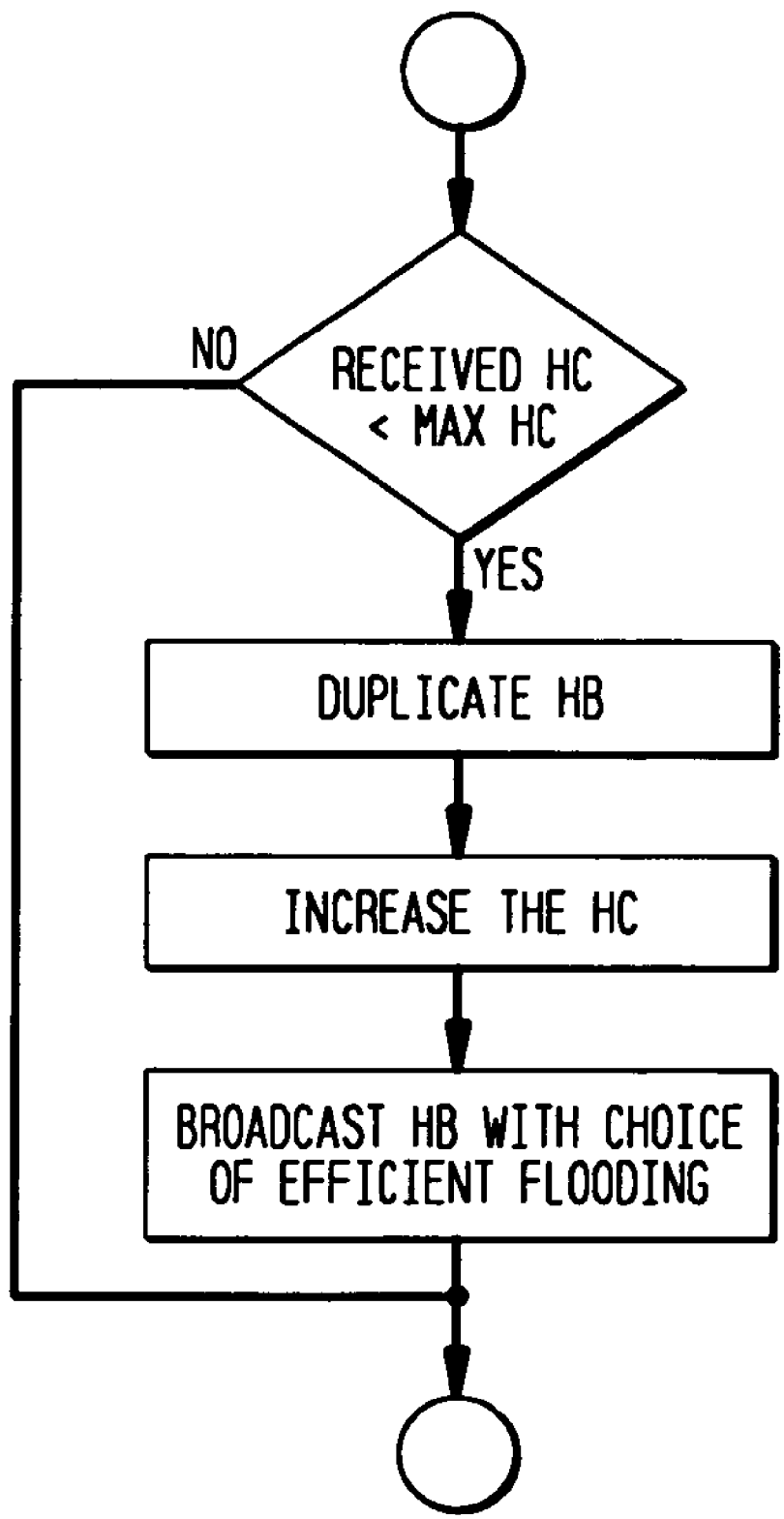

FIGS. 7A and B show a modified method to include this special HB, in combination with the light suppression technique described in FIG. 5. Specifically, the additions of steps 602 and 603 show the differences between this and FIG. 5. If the HB is broadcast from an RSU, it may undergo either flooding technique based on the steps in FIG. 7B.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A method for dissemination of control messages between nodes within a local peer group in a wireless ad-hoc network, the method comprising:
   receiving a first control message including at least one routing parameter from a group header node, where the first control message includes a plurality of routing parameters, said plurality of routing parameters further comprising a sequence number, group list, hop count to the group header node, and next hop to the group header node;
   determining if the first control message has been broadcast by a downstream node, upstream node, or a peer node by comparing the hop count to the group header node of the first control message to a hop count to the group header node of the current node, wherein if the two hop counts are equal, then the first control message has been broadcast by a peer node;
   discarding the first control message if the hop count of the first control message is less than the hop count of the current node; and
   canceling the time and changing a status of the control message within the plurality of routing parameters to "Sent", if the hop count of the first control message is greater than the hop count of the current node;

discarding the first control message if it is determined that the first control message has been broadcast by a downstream node;
determining if said first control message is in sequence using a sequence number;
discarding the first control message if not in sequence;
setting a time to a random value if it is determined that the first control message has been broadcast by a peer node;
updating a routing table based upon at least one of said plurality of routing parameters;
receiving a second control message including at least one additional routing parameter from a group node within said local peer group;
updating the routing table based upon said at least one additional routing parameter; and
generating a forwarding table from said routing table when both of said updating steps are completed; and
broadcasting the first control message upon expiration of the time, if no downstream node has broadcast the first control message during said time.

2. The method of claim 1, further comprising:
determining a source for said second control message;
determining a direct sender of said second control message;
modifying a next hop for said source via said direct sender based upon said at least one additional routing parameter in said second control message; and
modifying said next hop for said direct sender based upon said at least one additional routing parameter in said second control message.

3. The method of claim 2, wherein said forwarding table is used for routing packets of information.

4. The method of claim 3, wherein after reception of said first control message, a node increments the hop count in said first control message and inserts said node's identification into the next hop to the group header node in said first control message.

5. The method of claim 4, wherein said node forwards said first control message after performing said incrementing and inserting.

6. The method of claim 4, wherein after reception of said second control message, a node forwards said second control message towards said group header node.

7. The method of claim 1, further comprising:
if the first control message is received from a Road Side Unit (RSU), then updating the routing entries of the RSU; and
broadcasting the first control message.

8. A method for dissemination of control messages between nodes within a local peer group in a wireless ad-hoc network, the method comprising:
receiving a first control message from a group header node;
broadcasting the first control message;
receiving a second control message from a group node within the local peer group in response to the first control message;
storing a sequence number of the second control message;
receiving a third control message from the group header node;
comparing a sequence number of the third control message with the sequence number of the second control message;
broadcasting the third control message only if the sequence number of the third control message is greater than the sequence number of the second control message minus a preset constant; and
discarding the third control message if the sequence number of the third control message is less than the sequence number of the second control message minus the preset constant,
wherein the preset constant determines a number of control message cycles that pass before broadcasting or discarding the third control message.

9. The method of claim 8, further comprising:
updating a routing table based upon at least one of a plurality of routing parameters included in the first control message;
updating said routing table based upon said at least one additional routing parameter included in the second control message; and
generating a forwarding table from said routing table when both of said updating steps are completed.

10. The method of claim 9, further comprising:
determining a source for said second control message;
determining a direct sender of said second control message;
modifying a next hop for said source via said direct sender based upon said at least one additional routing parameter in said second control message; and
modifying said next hop for said direct sender based upon said at least one additional routing parameter in said second control message.

11. The method of claim 10, where said forwarding table is used for routing packets of information.

12. The method of claim 11, wherein after reception of said third control message, a node increments a hop count in said third control message and inserts said node's identification into the next hop to a group header node in said third control message.

13. The method of claim 12, wherein said node forwards said third control message after performing said incrementing and insertion.

14. The method of claim 11, wherein after reception of said second control message, a node forwards said second control message towards said group header.

15. The method of claim 8, further comprising:
if the third control message is received from a Road Side Unit (RSU), then updating the routing entries of the RSU; and
broadcasting the third control message.

* * * * *

UNITED STATES PATENT AND TRADEMARK OFFICE
CERTIFICATE OF CORRECTION

PATENT NO. : 8,351,417 B2  Page 1 of 1
APPLICATION NO. : 12/120330
DATED : January 8, 2013
INVENTOR(S) : Chen et al.

It is certified that error appears in the above-identified patent and that said Letters Patent is hereby corrected as shown below:

On the Title Page, Item (57), under "ABSTRACT", in Column 2, Line 15, delete "cycles" and insert -- cycles. --, therefor.

In the Specification

In Column 4, Line 16, delete "invention" and insert -- invention. --, therefor.

In Column 5, Line 52, delete "vehicle 100" and insert -- vehicle 110 --, therefor.

In Column 6, Line 26, delete "network when" and insert -- network. When --, therefor.

In Column 6, Line 40, delete "The ON" and insert -- The GN --, therefor.

In Column 6, Line 52, delete "basis" and insert -- basic --, therefor.

In Column 8, Line 45, delete "The MB" and insert -- The HB --, therefor.

In Column 8, Line 48, delete "the MB" and insert -- the HB --, therefor.

In Column 10, Line 51, delete "message F broadcast" and insert -- message broadcast --, therefor.

In Column 12, Line 55, delete "GILD" and insert -- GID --, therefor.

In Column 13, Line 5, delete "the r routing" and insert -- the routing --, therefor.

In the Claims

In Column 16, Line 37, in Claim 11, delete "where" and insert -- wherein --, therefor.

Signed and Sealed this
Eleventh Day of November, 2014

Michelle K. Lee
*Deputy Director of the United States Patent and Trademark Office*